United States Patent [19]
Hollerich

[11] Patent Number: 5,946,216
[45] Date of Patent: Aug. 31, 1999

[54] VERTICAL TRANSPORT DEVICE FOR RECORDING AND VERIFYING PLASTIC DISKS

[75] Inventor: Donald Hollerich, Edina, Minn.

[73] Assignee: Cedar Technologies, Inc., Edina, Minn.

[21] Appl. No.: 08/968,259

[22] Filed: Nov. 12, 1997

Related U.S. Application Data

[60] Provisional application No. 60/030,813, Nov. 14, 1996.

[51] Int. Cl.⁶ .......................... B07C 17/00; G06F 17/00; G06F 7/00
[52] U.S. Cl. .................................. 364/478.11; 206/308.1; 206/307; 206/309; 206/307.1; 369/34; 400/120.16
[58] Field of Search .................... 364/478.11; 206/308.1, 206/307, 309, 307.1; 369/34; 400/120.16

[56] References Cited

U.S. PATENT DOCUMENTS

| | | | |
|---|---|---|---|
| 4,910,675 | 3/1990 | Burns et al. ..................... | 364/478.11 |
| 5,135,376 | 8/1992 | Watanabe et al. ................ | 425/110 |
| 5,181,081 | 1/1993 | Suhan ............................. | 356/394 |
| 5,451,130 | 9/1995 | Kempf ............................ | 414/27 |
| 5,518,325 | 5/1996 | Kahle ............................. | 400/70 |
| 5,854,175 | 12/1998 | DeBoer et al. ................. | 503/227 |

*Primary Examiner*—William Grant
*Assistant Examiner*—McDieunel Marc
*Attorney, Agent, or Firm*—Nikolai, Mersereau & Dietz, P.A.

[57] ABSTRACT

A device for automatically publishing a plurality of compact disks includes a labeling station, a cleaning station, a recording station, a verification station, a transport mechanism and a controller. The transport mechanism includes separate bins for a supply of blank disks, correctly recorded disks, and reject disks. The transport mechanism also includes a picker for moving individual disks between the various bins and stations. The controller automatically controls the various functions of the various components of the device.

14 Claims, 9 Drawing Sheets

VERTICAL TRANSPORT DEVICE FOR RECORDING AND VERIFYING PLASTIC DISKS

BACKGROUND OF THE INVENTION

This application claims the benefit of Provisional Application Ser. No. 60/030,813 entitled "Vertical Transport Device for Plastic Disks", filed Nov. 14, 1996.

I. Field of the Invention

The present invention relates to a device for automatically publishing compact disks. More specifically, the present invention relates to devices capable of automatically labeling, cleaning, recording and verifying data recorded on plastic compact disks adapted to hold pre-recorded digital information.

II. Description of the Prior Art

Compact disks are frequently used to record high quality audio and video information. Such disks are also used to record information including computer software and data of various types. The disks are characterized by a construction which is formed of a plurality of layers including a reflective inner layer and a protective top layer upon which characters and graphics can be printed using an appropriate printing mechanism. Such disks are commonly referred to as CD's or DVD's.

There currently exists a number of devices for labeling compact disks and for recording information on such disks. Typically, such equipment is very expensive, consumes much space and designed for mass production. Factories incorporating such equipment generally have separate workstations and utilize a variety of methods for loading and unloading the disks with respect to the individual workstations and for transferring the disks from workstation to workstation.

The standard method used today to transport disks to a recorder is to place a stack of disks on a spindle which goes through the center of the disks. The disks are then raised vertically along the spindle to a fixed picking mechanism. The picking mechanism clutches a disk and moves the disk horizontally until it is over an open drawer of the recorder. The picking mechanism then drops the disk into the drawer, the drawer is retracted, and information is recorded on the disk. Once recording is complete, the drawer is opened and the disk is raised back up using the picking mechanism. The picking mechanism then moves the disk horizontally to a location above an output spindle. The disk is again dropped, this time onto the output spindle. This method is repeated for each disk. A variation of this method incorporates a labeling printer between the recorder and output spindle.

When a labeling printer is present, the picking mechanism moves the disk to a location above the open drawer of the labeling printer and drops the disk onto the drawer. The drawer is retracted and the labeling is printed. Once printing is complete the drawer is opened and the disk is raised back up by the picking mechanism which clutches the disk and delivers it to the output spindle as described above.

Other variations of the above method have also been used. Pickers for clutching an elevating blank disk from a tub of disks are known. There are also pickers which pick a disk from a spindle or stack and rotate it to a fixed recorder, verifier or printer. Such equipment is made by companies including Eastman Kodak, Rimage, MediaForm, CopyPro and MicroTech.

Various problems exist with the equipment and methods used in the prior art. First, the picking methods are complicated requiring expensive and robust devices. Second, the vertical and horizontal movement mechanisms of the prior art devices require various motion sensors to detect the presence of disks and other elements which adds complexity and cost to the units. Third, the sensing mechanisms typically used have not been sufficiently reliable making it necessary to incorporate protective measures around the transport mechanism resulting in increased costs and complexity. Fourth, prior art units often fail to provide an effective method for cleaning the disks. Placing the disks into the recorder with dust particles clinging to the recording surface of the disks can cause recording errors resulting in reduced reliability. Fifth, prior art mechanisms require that the disks be manually placed onto spindles or into tubs. Such handling can cause smudges or dust particles to cling to the disks again adversely affecting the reliability of the recording process.

SUMMARY OF THE INVENTION

One object of the present invention is to provide an integrated, automatic device for placing labels and information onto compact disks.

Another object of the invention is to provide such a device which has a small footprint so that it can effectively sit on a desktop.

Still another object of the invention is to provide such a device which is also capable of effectively cleaning the disks before information is recorded to reduce recording errors caused by dust or debris on the disk.

A further object of the invention is to provide such a device which is also capable of checking the disks for recording errors and separating error-free disks from those evidencing recording errors.

Still a further object of the invention is to provide a simple, inexpensive mechanism for transporting disks between various stations.

Another object of the invention is to provide a device which meets all of the objectives outlined above and is capable of automatically labeling, cleaning, recording, checking and sorting up to fifty compact disks.

These and other objects are achieved by providing a device having the following features.

The device includes a housing. Associated with the housing are a labeling printer, a cleaning brush, a data recorder, a sliding tray upon which two disk holders can be mounted, a reject tray and a picker mechanism. Various data recorders are now available which are capable of not only writing data to the disk, but also reading the data recorded on the disk for verification purposes. One such recorder is made by Teac. When such a recorder is not used, the device might also have a separate drive for verifying the data recorded on the disk.

The two removable disk holders are each capable of containing up to fifty disks. The removable holders are mounted on a sliding tray so that the tray can be slid horizontally to selectively position the holders beneath the picker. The device automatically operates to process the disks in the following manner. A stack of up to fifty new disks are placed in one of the holders on the tray. The tray slides the holder into position beneath the picker. The picker grasps the top disk through the disk's center orifice. The disk is transported vertically using the picker until it is above the drawer of the printer. The printer extends its drawer to the open position. The picker mechanism places the disk into the drawer. The drawer is retracted and the printer labels the disk. After the disk has been labeled, the printer opens its drawer and the disk will again be grasped by the picker and raised up above the drawer of the printer. The drawer is then closed. The disk is lowered by the picker to a cleaning area. The ionized brush moves across the lower surface of the disk to remove any dust or lint particles. The disk is then raised to a position above the recorder's drawer. The recorder's drawer is opened and the clean disk is placed into the drawer. The door is closed and data is recorded on the disk. Depending upon the type of recorder, the data recorded might also be verified at this stage. After the recording is complete, the recorder will open its drawer and the picker will grasp the disk and raise it up so the recorder's drawer can again close. If a separate verifier drive is to be used, the drawer of the verifier drive is opened and the picker places the disk into the open drawer. The verifier drive's drawer closes and the verifier drive checks the disk for recording accuracy. Once this step is complete, the drawer of the verifier drive opens, the picker grasps the disk and the disk is delivered either to the other removable holding bin on the sliding tray or to the reject tray depending upon the results of the verification step. This process can be repeated up to fifty times without reloading the input tray.

The operation of the device is under program control. This control program governs the operation of the sliding tray, the picker, the brush, and the drives. To provide this program control, the device will either have to include an internal controller or an interface allowing it to be coupled to an external controller such as a computer.

The design of the picker is also simple, inexpensive, lightweight, and relatively maintenance free. It includes a grasping mechanism for operating a set of picking fingers and an elevator for raising and lowering the grasping mechanism. The picking fingers of the grasping mechanism have a slight undercut which allows them to lift and hold a compact disk through its center hole when the fingers are expanded. The fingers are coupled to picking fingers to concentric slots in a circular disk. The disk is rotated in one direction by a solenoid and in the opposite direction by a spring. The disk is normally rotated by a spring to a position in which the fingers are held in the disk gripping, expanded position. The solenoid is capable of overcoming the force of the spring to rotate the disk in the opposite direction to compress the fingers and release the disk. The operation of the solenoid is governed by the controller.

The picker's elevator includes a pair of vertical guide shafts and a vertical helically threaded shaft all in parallel alignment. Rotation of the helically threaded shaft in one direction causes the grasping mechanism to rise. Rotation in the opposite direction causes the grasping mechanism to fall. Rotational movement of the helically threaded shaft is imparted by a pulley and belt arrangement which couples the helically threaded shaft to a slip clutch and stepper motor. Given this arrangement, the controller sends pulses to a stepper motor. This arrangement allows the movement of the elevator (and thus the height of the picker's fingers) to be precisely controlled. For added precision and to provide feedback to the controller, a rotary sensor is also provided to monitor movement of the elevator. This arrangement is an improvement over previous methods of moving the picking mechanism because it greatly simplified the design, reducing cost, weight and maintenance. Also, no other sensors are required to detect the presence of a disk, to prevent injury to the operator, or to prevent damage to the components of the device or the disks.

The cleaning brush is mounted to a retractable arm. The arm is extended and retracted by a motor to swipe across the bottom surface of the disk to remove any particles that could cause recording errors. The cleaning brush is ionized, specially coated and grounded. Again, this design is superior to previous methods. No manual intervention is required to clean the disks.

The sliding tray is designed so that two disk holders can be mounted on the tray, one in front of the other. Up to fifty disks are placed in a first holder and the second holder, is left empty. The disks are picked one at a time from the first holder, processed, and then placed in the second holder. When all fifty disks are produced, the second holder is removed, the first holder is repositioned to replace the second holder, and a new fifty-disk stack of disks in a third holder is placed in the original position of the first holder. This method is an improvement over previous methods since it offers a low cost method of transporting disks between workstations and eliminates the need to have the disks touched by human hands. The holders can also be used to transport a stack of disks to other stations or to insert the disks into standard beehive shipping containers.

These and other advantages and features of the present invention will become more clear by reading the following detailed description in view of the accompanying drawings.

DETAILED DESCRIPTION OF THE PREFERRED EMBODIMENTS

Figure 1:
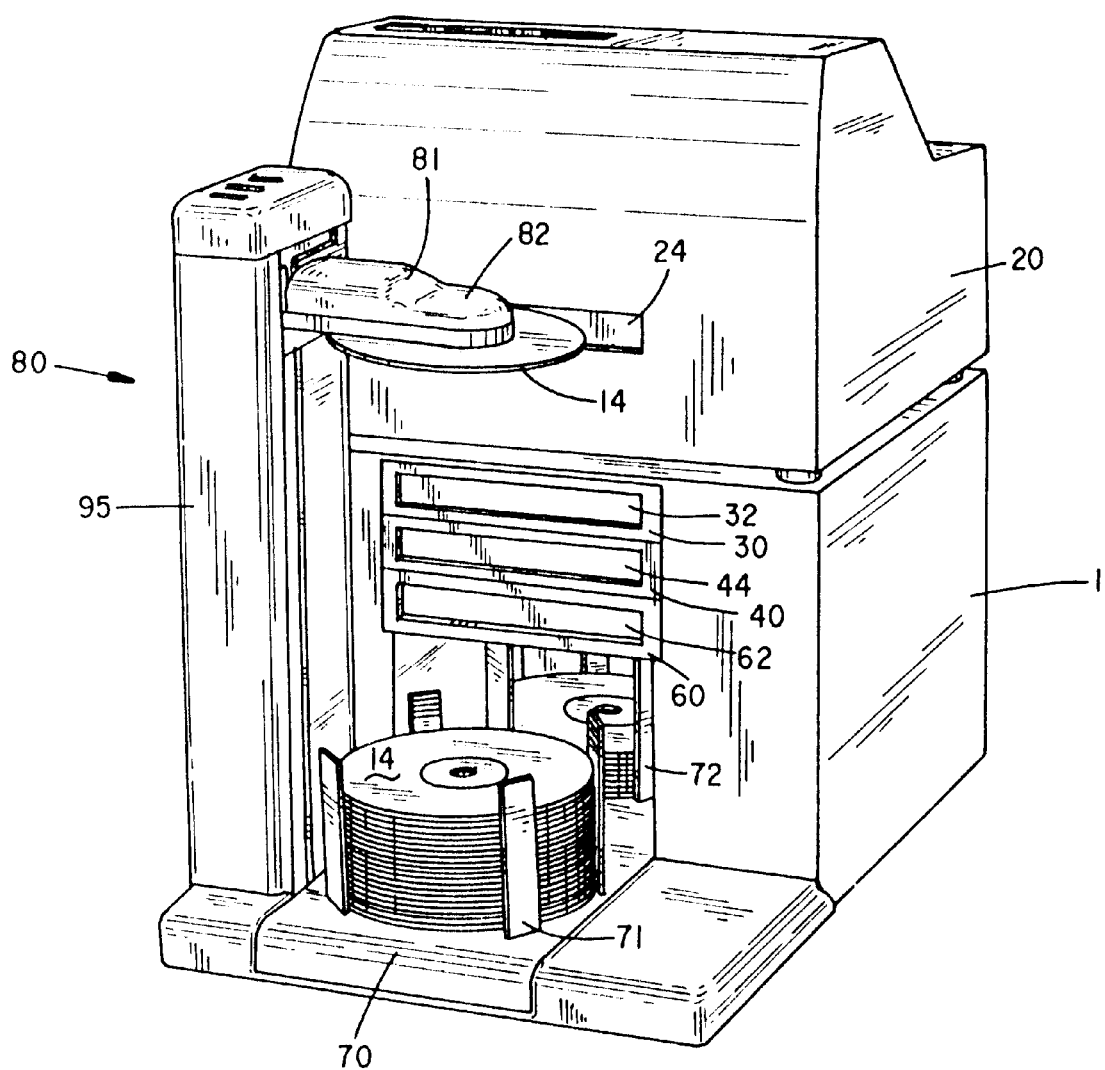
FIG. 1 is a perspective view of the transport, recording and verifying device of the present invention.
Figure 2:
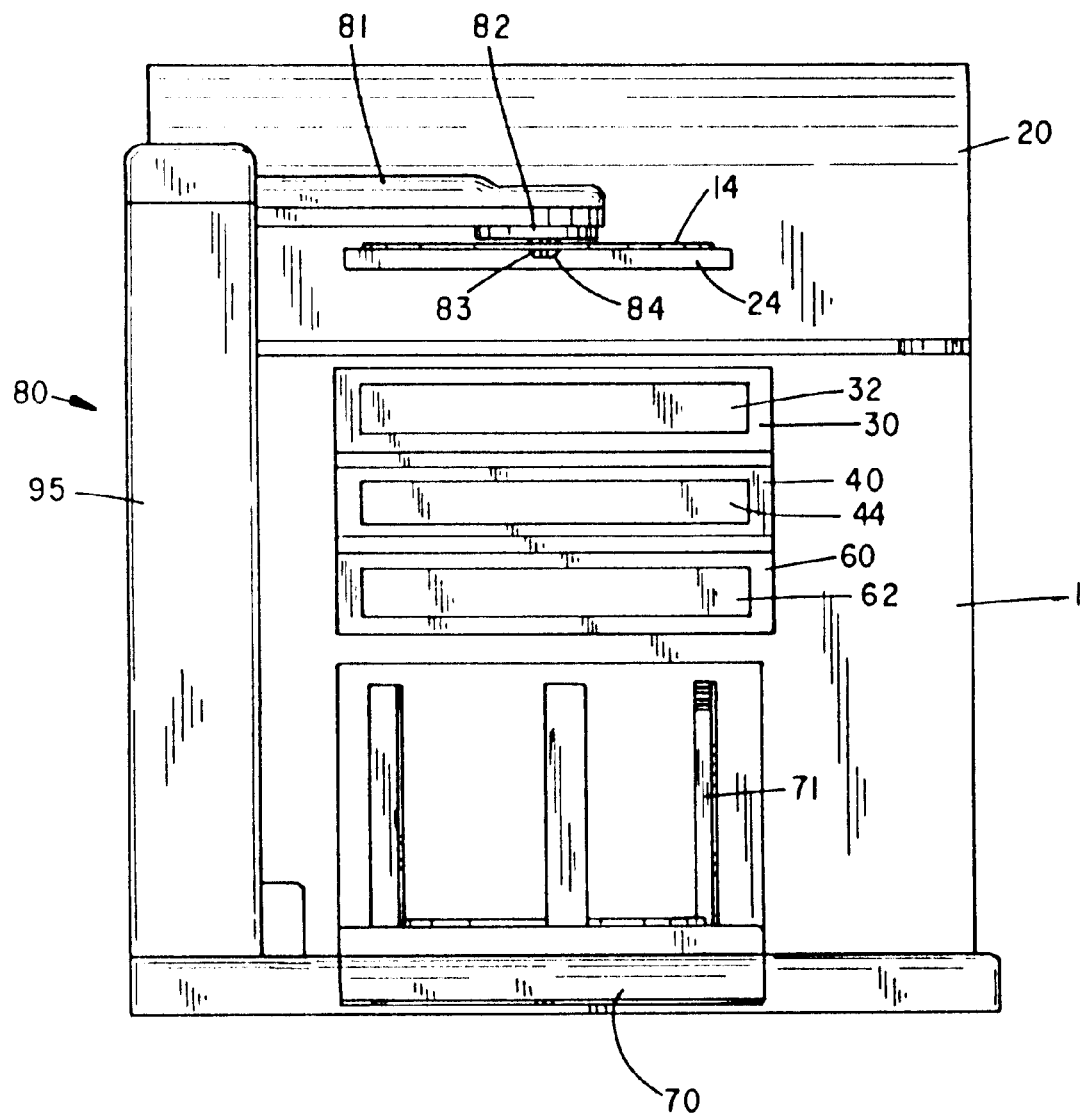
FIG. 2 is a front elevational view of the device shown in FIG. 1.
Figure 3:
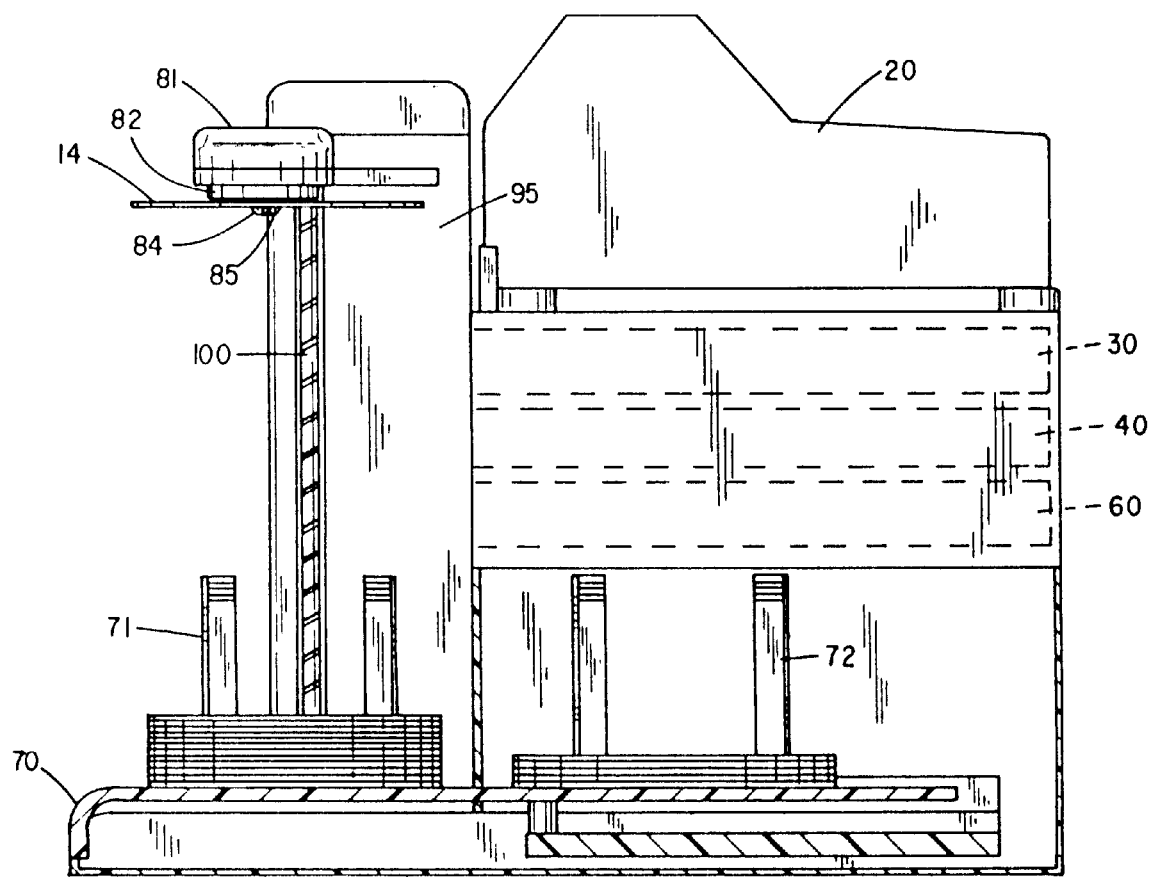
FIG. 3 is a side view of the device shown in FIG. 1 with a portion cut away to expose interior features.

The present invention provides an integrated system for publishing compact disks. Such disks, after processing by the system, include a label for identifying the disk and its contents. The disks will also have digital information recorded on them. Such digital information can have a variety of forms. It can be in the form of music to be played through an audio system equipped with a compact disk player. It can be in the form of movies or shows to be played through a television coupled to a DVD player. It can be in the form of computer programs, text files, graphics files or the like to be accessed using a personal computer. It can be in the form of games to be played on a special game player. Not only can the form of the information stored on the disk be varied, but the format used to store the information can also be varied to accommodate different types of reading or playing devices.

The system provided by the present invention is small, compact, inexpensive and ideally suited for short run compact disk production. The present invention will be described in the context of a system designed to automatically process up to fifty compact disks without operator intervention. This system includes a label printing station 20, one or more information recording stations 30, one or more information verifying stations 40, a cleaning station 50, a reject station 60, a slidable disk tray 70 including disk holders 71 and 72 and a picker 80. The system may also include either an internal controller or an electronic interface 120 which allows the system to be coupled and controlled by an external controller such as a personal computer.

As shown in FIG. 1, the device of the present invention includes a housing 1. The housing 1 is generally quite small in size. In fact, in its most basic form, the system can fit into a housing 1 having a width of 11 inches, a height of 16 inches, and a depth of 16 inches. All of the components of the system are mounted to the housing 1. Typically visible from the exterior of the housing 1 will be a power cord used to carry 120/220 VAC 50/60 Hz power to the device, one or more SCSI-2 connectors 22, a power switch, various control switches and various indicator lights (LED's). The functions of the connectors, switches and indicator lights are discussed in greater detail below.

Located at the top of the housing 1 is the label printing station 20. The printing station 20 is provided to print labels on the disks 14 to be processed. The labels are intended to identify the disk 14 and its contents. Various label printers can be incorporated to provide label printing station 20. Companies making such printers include Rimage and Fargo. Such printers typically come either with a Centronics or Apple serial interface so that the printer can be controlled by a personal computer. These printers include a drawer 24 which slides between an open position to permit one to insert or remove disks from the printer and a closed position to permit the printer to label a disk. The printer selected will preferably be a color printer capable of printing at least 600×300 dots per inch so that the labeling printed on the processed disks will have a clean, sharp appearance.

Located below the label printing station 20 in FIG. 1 is an information recording station 30. Again, various types of drives capable of writing information to a compact disk are known and available which are suitable for use as the information recording station 30. Teac is just one company which manufactures and sells such drives. No matter which drive is selected to serve as the information recording station 30, it should be capable of writing to 5.25 inch disks. It should also have a drawer 32 capable of automatically opening to permit insertion or removal of disks and closing to permit recording of information to the disk. The drive should also have a SCSI-2 port through which instructions and data are transferred to and from the drive.

Ideally, the drive selected for the information recording station 30 will be able to not only write to the disks 14, but also be able to read the information recorded on the disks 14 for verification purposes. Alternatively, a separate verifying station 40 will be provided. This verifying station 40 includes a drive capable of reading the information stored on the disk. Various drives are commercially available which are ideally suited for this purpose. Whichever drive is selected, it should include a SCSI-2 interface for receiving and transmitting information and instructions. It should also include a drawer 44 capable of opening so that disks can be inserted into and removed from the drawer 44 and closing so that the information on the disks can be verified.

Figure 7:
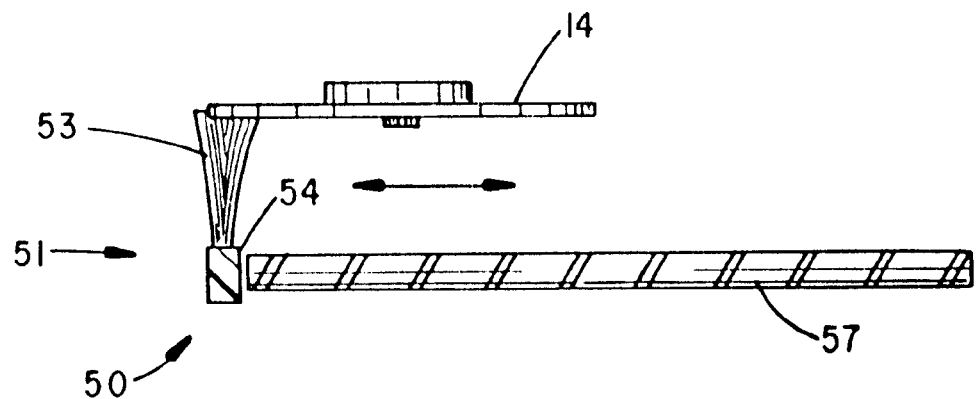
FIG. 7 is a side view of the brush mechanism.
Figure 8:
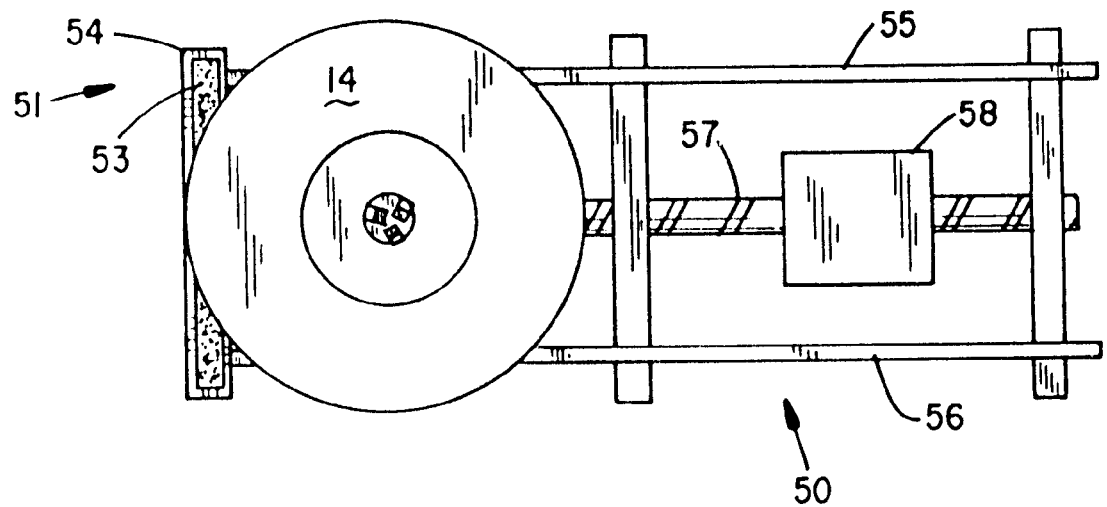
FIG. 8 is a top view of the brush mechanism.
Figure 9:
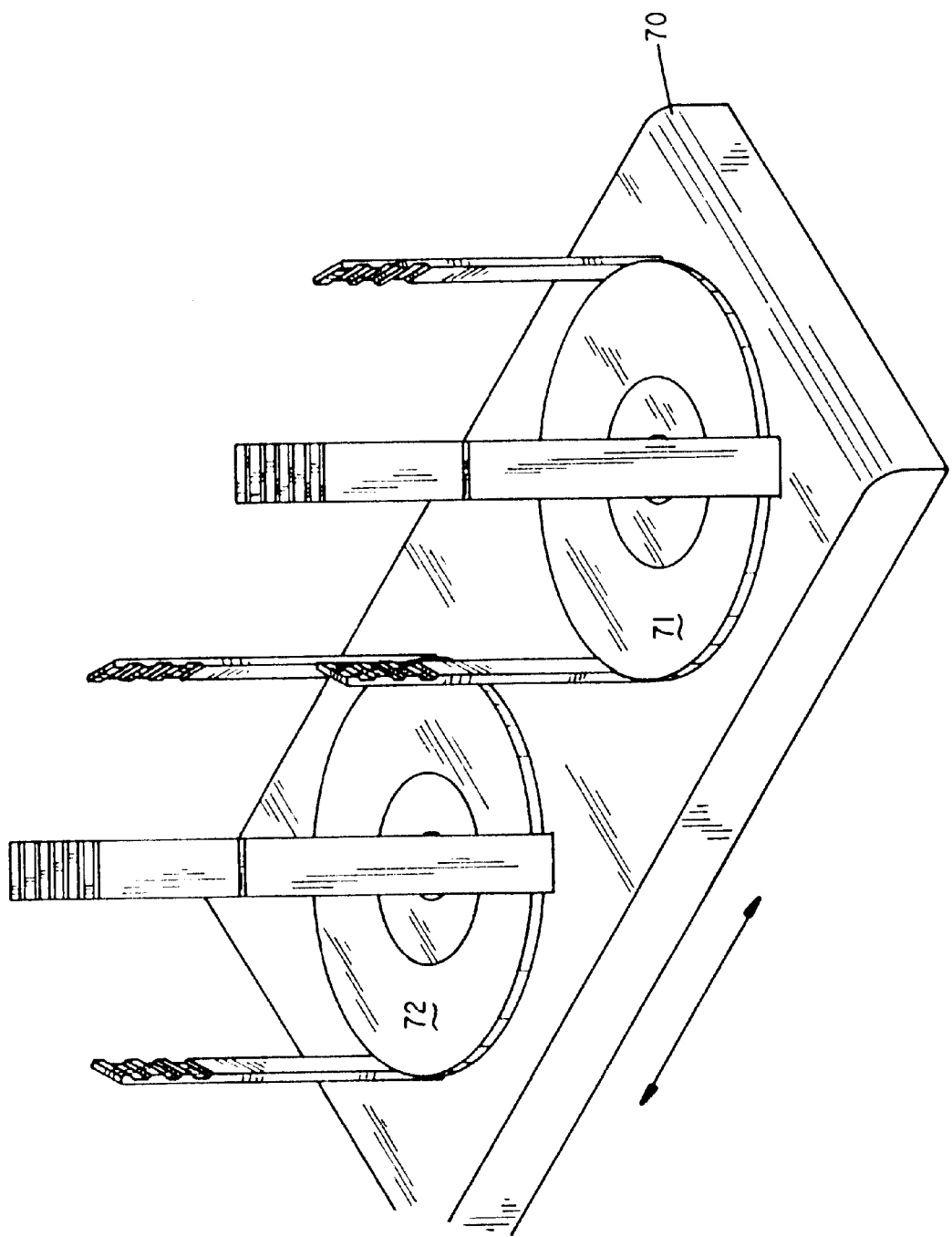
FIG. 9 is a perspective view of the slidable disk tray.

The cleaning station 50 is shown in FIGS. 7 and 8. It will typically be positioned beneath the reject station 60. The cleaning station 50 includes an ionized cleaning brush and an arm mechanism 52. The brush 51 includes ionized soft bristles 53 attached to a grounding plate 54. The arm mechanism 52 includes first and second guide bars 55 and 56 and a helically threaded drive bar 57, each of which is coupled to the grounding plate 54. A motor and ball gear arrangement 58 are coupled to the helically threaded drive bar 57 so that the helically threaded drive bar 57 can be rotated in a first direction to extend the brush 51 and in a second direction to retract the brush 51 into the housing 1.

The reject station 60 is, in essence, a bin 62 capable of being extended from the housing 1 to receive reject disks and retracted into the housing to store the rejected disks. The mechanism for moving the bin 62 in and out is virtually identical to the motorized system used to move the doors of the drives in and out.

The slidable disk tray 70 is essentially a platform upon which the disk holders 71 and 72 are mounted. The tray 70 is slidably mounted to the housing 1 and coupled to a DC motor via a rack and pinion gear arrangement, not shown, which is capable of sliding the disk tray 70 back and forth to position the disk holders 71 and 72. A pair of limit switches cooperate with the disk tray 70 to assist in positioning the disk holders 71 and 72.

The picker 80 is a critical component of the present invention. The picker 80 grasps the disks, vertically raises and lowers the disks to the proper station, and also releases the disks into the proper drawer, tray or bin.

The picker 80 includes a grasping mechanism 82. The grasping mechanism 82 includes a horizontal platform 81. In the embodiment shown in the drawings, the grasping mechanism 82 also includes three fingers 83, 84 and 85. Each finger includes a mounting arm 86 and a grasping arm 87 extending in a downward generally perpendicular direction from the mounting arm 86. The grasping arms 87 each extend through an orifice 88 in the horizontal platform 81. A pin 89 is used to pivotally secure the mounting arm 86 of each finger to the horizontal platform 81. The mounting arm 86 of each finger is also secured to a pivot plate 90 by a pin 91. A spring (not shown) is secured at one end to the horizontal platform 81 and at the other end to the pivot plate 90. The spring applies a force to the pivot plate 90 which is sufficient to move and hold the fingers 83, 84 and 85 in a first, grasping position. The fingers 83, 84 and 85 are designed so that when they are in this position, they can grasp and hold a single compact disk 14 through the center hole 15 of the disk 14. Also secured to the pivot plate 90 and to the horizontal platform 81 is a solenoid 94. Actuation of the solenoid 94 applies a force to the pivot plate sufficient to overcome the force of the spring and rotate the pivot plate 90 to draw the fingers 83, 84 and 85 into an area smaller than the diameter of the center hole 15. The solenoid 94 is thus used to compress the fingers so that they can enter or exit the center hole 15 of the disk 14.

Figure 4:
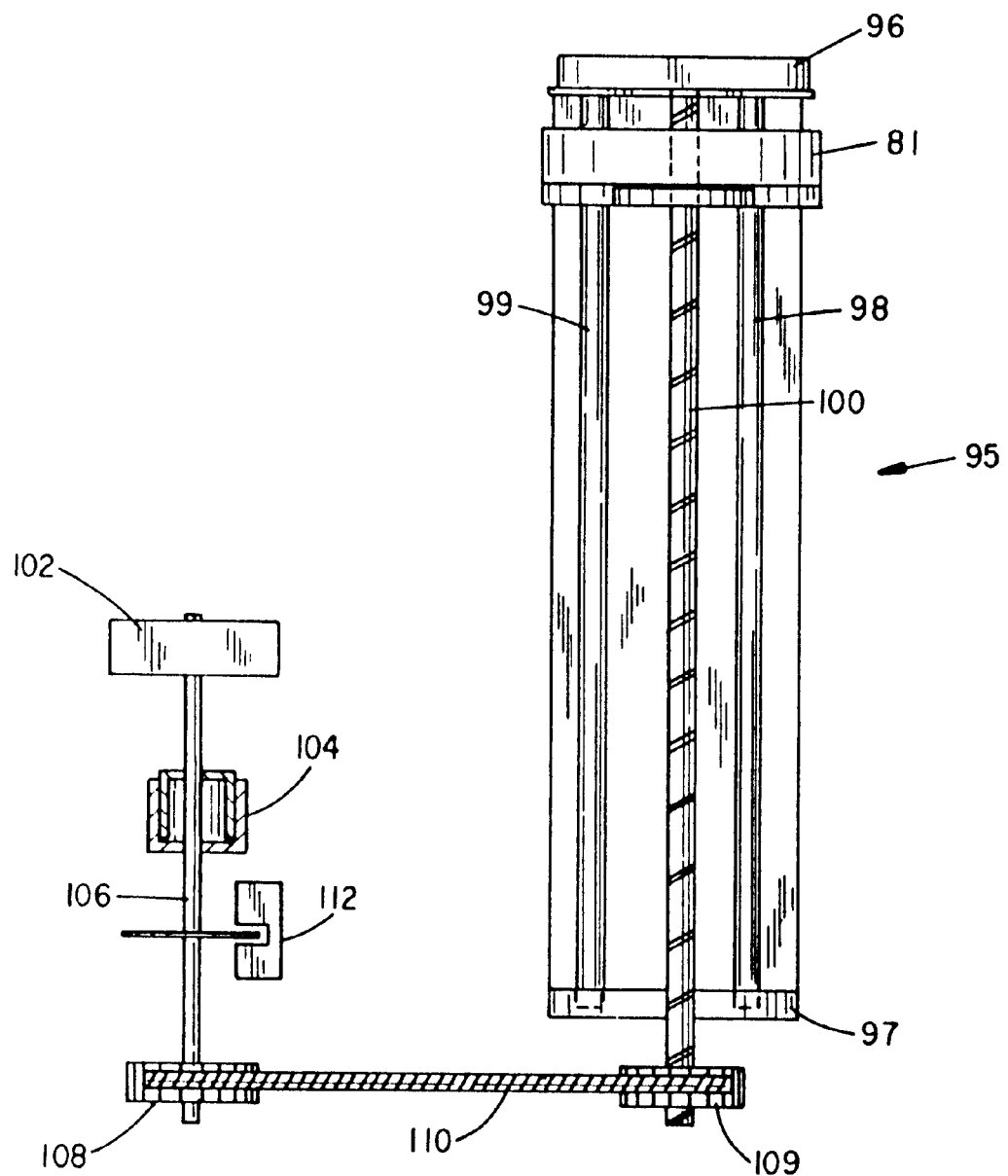
FIG. 4 is a side elevational view of the components of the elevator mechanism.
Figure 5:
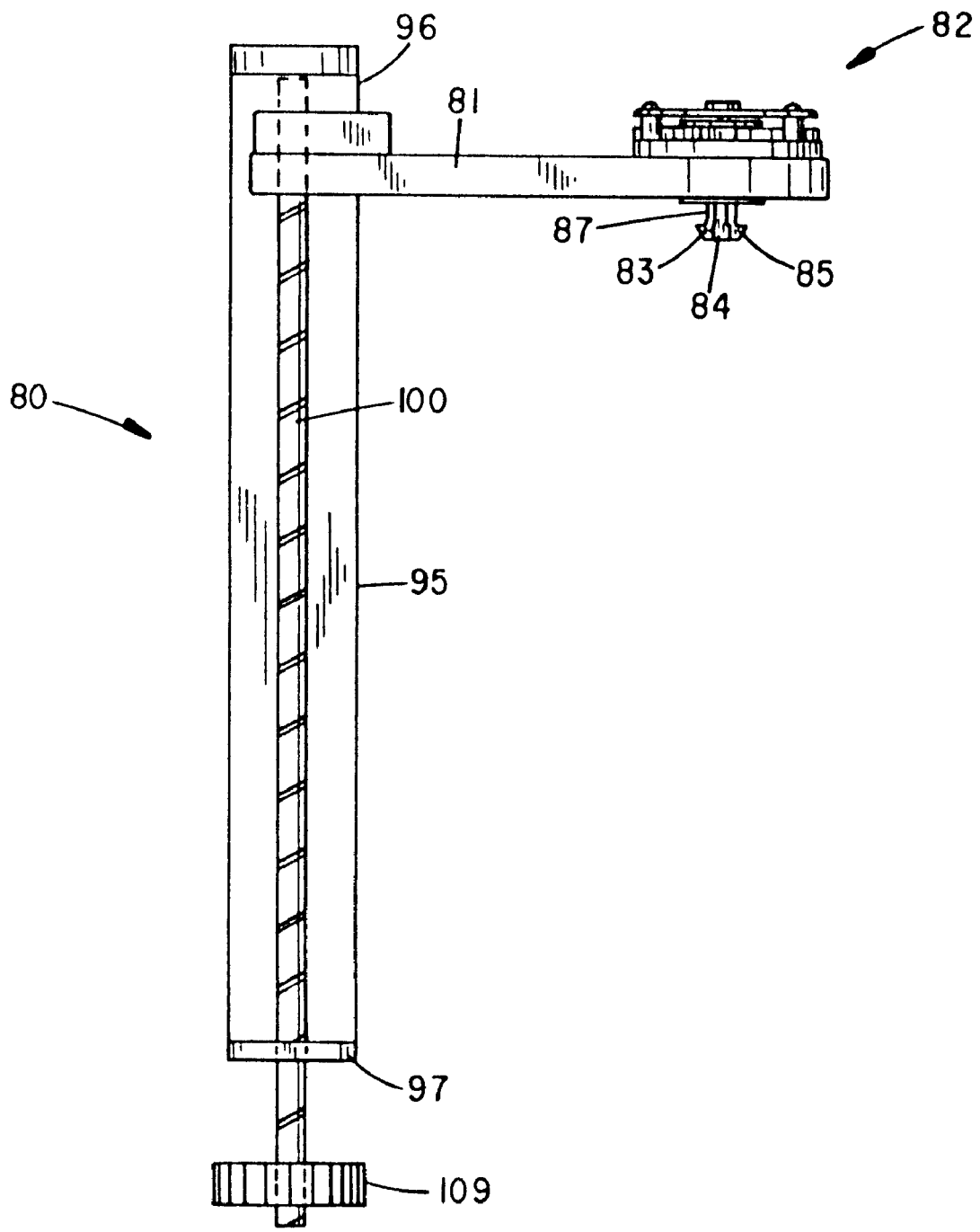
FIG. 5 is a front elevational view of the components of the elevator mechanism.
Figure 6:
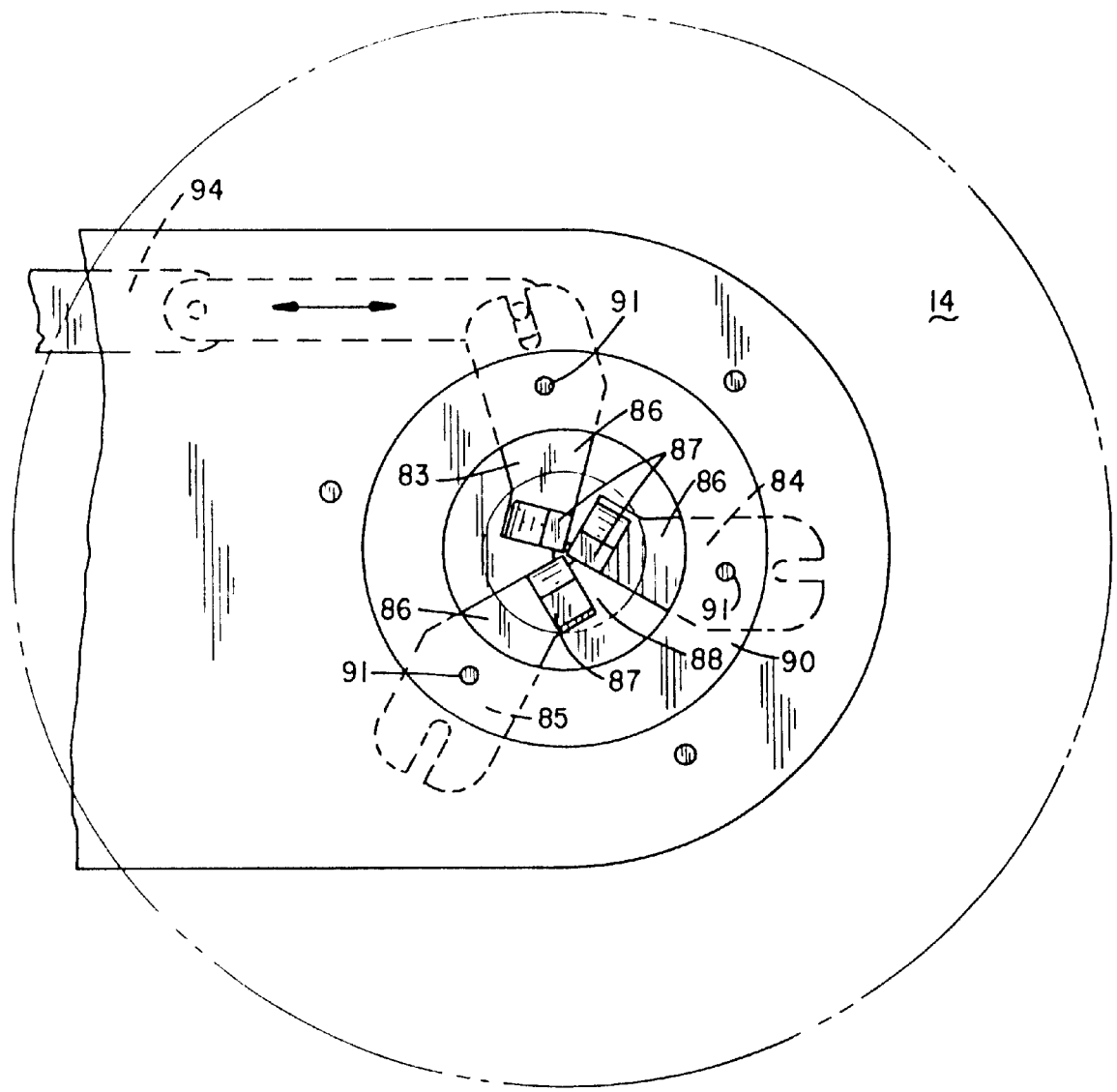
FIG. 6 is a bottom view showing the grasping mechanism of the picker.

Another important feature of the picker 80 is the elevator 95. The elevator 95 is used to move the grasping mechanism 82 vertically up and down in a controlled fashion. As shown in FIG. 4, the elevator includes a pair of mounting members 96 and 97, a pair of guide shafts 98 and 99, and a helically threaded shaft 100. The mounting members 96 and 97 retain the guide shafts 98 and 99 and the helically threaded shaft 100 in parallel alignment. The horizontal platform 81 is mounted to the guide shafts 98 and 99 and helically threaded shaft 100 between the mounting members 96 and 97 so that rotation of the helically threaded shaft 100 in one direction will raise the horizontal plate 81 and rotation of the helically threaded shaft 100 in the opposite direction will lower the horizontal plate 81.

Rotation can be imparted to the helically threaded drive shaft 100 in a variety of ways. In the preferred embodiment, a stepper motor 102 is coupled to a slip clutch 104 which is used to turn a drive shaft 106. A pulley 108 is mounted on the drive shaft 106. A comparable pulley 109 is mounted to the helically threaded shaft 100. A belt 110 couples the two pulleys together so that rotation of the drive shaft 106 causes the helically threaded shaft 100 to rotate. The stepper motor 102 and slip clutch 104 are designed so that the drive shaft 106 can be rotated in a first direction to raise the horizontal platform 81 and in a second direction to lower the horizontal platform 81. Rotation of the drive shaft 106 can be monitored by a rotary encoder 112.

Figure 10:
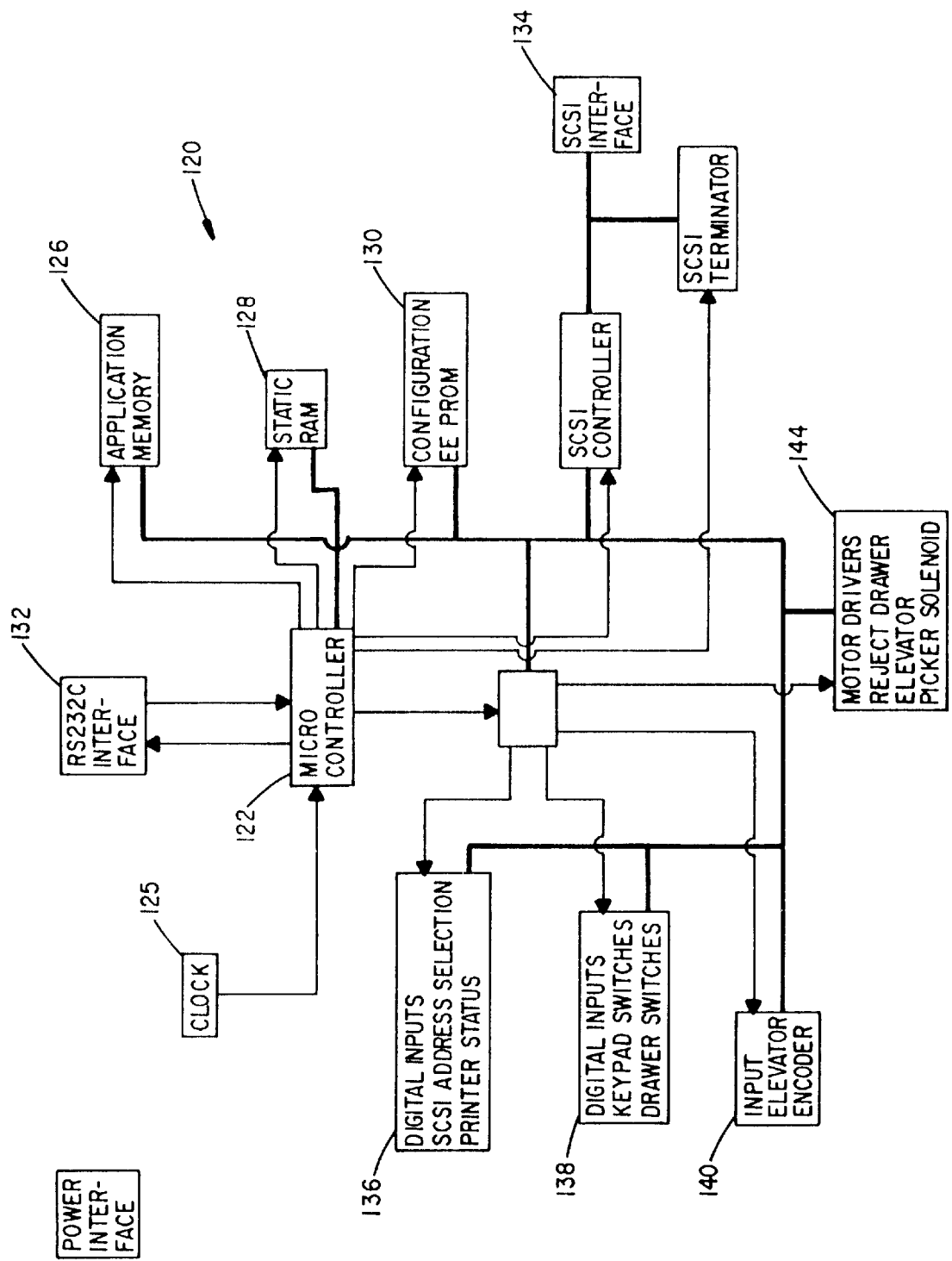
FIG. 10 is a block diagram of the electronic interface used to control the components of the invention.

In the preferred embodiment, the apparatus also includes an electronic interface 120 which communicates with an external computer via SCSI-II protocol over a SCSI-II connector 122. FIG. 10 is a block diagram of electronic interface 120. The interface 120 acts as a target SCSI device with a selectable address of 0 to 7. The address is set using the dip switch bank (not shown) electrically coupled to the interface 120.

As shown in FIG. 10, the interface 120 includes a microcontroller 122 coupled to a clock 125, application memory 126, static RAM memory 128, and configuration memory 130. Also coupled to the microcontroller 122 are various interfaces, including an RS-232C interface 132 and a SCSI interface 134, and three digital input ports 136, 138 and 140. The digital input port 136 couples the address selection dip switches to the microcontroller 122. It also is used to transmit printer status signals to the microcontroller 122. Digital input port 138 is used to couple the various switches on the unit to the microcontroller 122. Digital input port 140 couples the elevator's encoder 112 to the microcontroller 122. Finally, motor drivers 142 are used to couple the stepper motor 102, the solenoid 94 and the various motors associated with the print station 20, recording station 30, verifying station 40, clearing station 50, reject station 60, and the slidable disk tray 70.

The interface 120 operates in conjunction with an appropriately programmed external computer to control the operation of the components described above. For example, the picker 80 is controlled by the interface 120. The elevator 95 can be used to raise and lower the horizontal plate 81 along approximately a 12 inch path based upon control signals coming to it through the interface 120. Specifically, the interface 120 is connected to the stepper motor 102 and sends signals to the stepper motor 102 turning it on and off and controlling the direction in which it turns the drive shaft 106. The interface 120 is also connected to the rotary encoder which senses whether the drive shaft 106 is turning to determine whether the stepper motor 102 is stalled. A limit switch can also be connected to the interface 120 to send a signal indicative of the elevator 95 reaching a "home" position. The interface 120 likewise controls the solenoid 94 to move the fingers 83, 84 and 85 between the gripping and non-gripping position.

The interface 120 also controls movement of the slidable disk tray 70. Specifically, the DC motor which moves the disk tray 70 and a pair of limit switches are electrically coupled to the interface 120. One limit switch sends a signal to the interface 120 when the tray 70 reaches a first position in which one of the disk holder 71 is centered beneath the fingers 83, 84 and 85 of the picker 80. The other limit switch sends a signal to the controller interface 120 when the tray 70 reaches a second position in which the disk holder 72 is centered beneath the fingers 83, 84 and 85 of the picker 80. It is also possible to provide a proximity sensor coupled to the interface 120 and a second output line with a different resistance value between the interface 120 and the motor. If this configuration is used, the tray 70 can move quickly until its presence is sensed by the proximity sensor and then more slowly until it hits one of the limit switches and stops.

Movement of the bin 62 of the reject station 60 is also controlled by the interface 120. Such control is accomplished by electrically coupling the motor to the interface 120 and providing a bin open limit switch and a bin closed limit switch which send signals representative of the drawer's position to the interface 120.

The cleaning station 50 is controlled by the interface 120 in a manner identically to the way the reject station 60 is controlled. The motor and a pair of limit switches are all coupled to the interface 120 so the interface 120 controls the motor and receives signals from the limit switches indicative of the position of the brush 51. In fact, to reduce cost, the brush 51 can be mounted to the front edge of the reject bin 62.

The recording drive, verifying drive and the label printer used in constructing the system will all typically include an interface port that allows them to be coupled to the interface 120. This port could be, for example, a six pin TTL port or a six pin RS232C port for the printer. The port will in all likelihood be a fifty pin SCSI-2 port for the drives. This coupling allows the interface 120 to control the opening and closing of the drawers 24, 32 and 44. It also allows for data to be transferred between the external computer on the one hand, and the printers and drives on the other hand.

Each of the LED's and control switches are also coupled to the interface 120. The interface 120 energizes the LED's to indicate the status of the system. Each LED is a dual color red/green LED. The LED's are used to indicate whether (a) the system is ready or not; (b) the system requires some attention; (c) the disks are O.K.; (d) the input tray 71 is empty; (e) the reject station 60 is full; and (f) the output tray 72 is full. The interface 120, in order to generate such messages using the LED's must receive status signals from sensors able to indicate when the input tray 71 is empty, when the reject station 60 is full, and when the output tray 72 is full.

In essence, the interface provides the firmware required to control the system and further provides a mechanism by which the system communicates with an external computer and the host software run by the external computer. In view of the description of the system and its features provided above, its operation will now be described.

During the operation of the unit the software loaded on the external computer will receive a command to produce a disk or group of disks. The software will send signals to the interface 120 to cause each of the following steps to occur. First, the slidable disk tray 70 to move out so that the disk holder 71 containing a stack of blank disks is positioned directly below the fingers of the picker 80 so that the fingers are centered over the holes through the disks. A limit switch sends a signal through the interface 120 to the external computer when the disk tray 70 is in the correct position. Signals are then sent by the computer through the interface 120 to the stepper motor 102 enabling it to cause the elevator 95 to move the grasping mechanism 82 down toward the disks. At the same time, a signal is sent by the computer through the interface 120 to actuate the solenoid 94 so that the solenoid 94 retracts the fingers 83, 84 and 85 so the fingers can pass through the hold in the top disk 14. The solenoid 94 then is shut off so that the spring 92 forces the fingers outwardly to grip the top disk 14. The computer then sends signals to the stepper motor 102 through the interface 120 so that the picker 80 lifts the disk 14 to the top of the elevator 95. The computer then causes the printer drawer 24 to open. The disk 14 is placed under computer control in the drawer 24, the printer drawer 24 is retracted, the label is printed on the disk 14, and the drawer 24 is again opened. The picker 80 will then pick the disk 14 from the drawer 24 and lift it. The printer drawer 24 closes. After the printer drawer 24 closes, the picker 80 moves the disk 14 down to the cleaning station 50 where the ionized brush 51 will pass along the bottom surface of the disk 14 removing any dust or other particles which could interfere with the recording process. The cleaning brush 51 is then retracted and the picker 80 carries the disk 14 to the top of the elevator. The drawer 32 of the recording station 30 then opens and the disk 14 is placed in the drawer 32. The drawer 32 is retracted for recording of the disk. Once the information is recorded on the disk, the drawer 32 opens and the disk 14 is picked from the drawer 32. The drawer 32 is closed and the drawer 44 of the verifying station 40 is opened. The disk 14 is placed in the drawer 44. The drawer 44 closes and the content of the disk 14 is read to be verified. The drawer 44 is then opened and the disk 14 is again grasped and lifted by the picker 80. The drawer 44 is closed and, depending upon the results of the verification step, the disk 14 is either placed in the reject bin 62 if readable or it is dropped into the disk holder 72 which is used as the output stack.

What is claimed is:

1. An apparatus for automatically processing a plurality of disks, said apparatus including:
   a. a picker including a grasping mechanism having a plurality of fingers which are movable between a first gripping position and a second non-gripping position, and an elevator for imparting vertical up and down motion to said grasping mechanism, said elevator including a motor driven helical shaft which rotates to raise and lower the grasping mechanism;
   b. a tray coupled to a first holder in which a plurality of disks are stacked for processing and a second holder, said tray being slidable between a first position in which the picker can grasp a disk to be processed and lift it from said first holder and a second position in which the picker can deposit a processed disk into the second holder;
   c. a printing station for labeling the disks with printed matter, said printing station having a drawer movable between an open position in which the picker can release a disk to be printed or grasp a disk that has been printed and a closed position in which a printer can access the disk for applying labeling;
   d. a cleaning station having a retractable arm to which a brush is attached, said arm being movable to cause said brush to swipe across the disk to remove from the disk particles that can interfere with the recording of information on the disk, said arm also being movable to a retracted position in which neither the arm nor the brush will interfere with movement of the picker or a disk being carried by the picker;
   e. a recording station, said recording station having a drawer movable between an open position in which the picker can release a disk upon which information is to be recorded or grasp a disk upon which information has been recorded and a closed position in which a recorder can access the disk for recording information onto the disk.

2. The apparatus of claim 1 wherein said recording station is able to both write on the disk and read information written on the disk for verification purposes.

3. The apparatus of claim 1 further including a verification station, said verification station having a drawer movable between an open position in which the picker can release a disk to be verified or grasp a disk which has been verified and a closed position in which a reader can access the disk for verifying the information recorded on the disk.

4. The apparatus of claims 2 or 3 further including a reject storage station, said reject storage station including a drawer movable between a first position in which the picker can release a disk after it has been verified as containing incorrect information and a second position in which said drawer will not interfere with movement of the picker or a disk being carried by the picker.

5. The apparatus of claim 1 wherein each of said fingers include a mounting leg and a gripping leg projecting generally perpendicularly from said mounting leg, said gripping leg having an under cut.

6. The apparatus of claim 5 wherein said picker includes a horizontal plate, said horizontal mounting plate having a first orifice through which the gripping legs of the fingers project.

7. The apparatus of claim 6 further including means for pivotally mounting the mounting leg of each finger to the horizontal plate.

8. The apparatus of claim 7 further including means for coordinating the movement of the fingers between the gripping position and the non-gripping position.

9. The apparatus of claim 8 wherein said means for coordinating movement of the fingers includes a torque plate secured to the mounting leg, a spring for holding the torque plate so the fingers are maintained in the gripping position and a solenoid for overcoming the force of the spring and pivoting the torque plate so the fingers are moved to the non-gripping position.

10. The apparatus of claim 1 wherein said picker includes a horizontal plate and said elevator includes at least one guide shaft and a helically threaded shaft to which said horizontal plate is mounted for vertical movement up an down said guide shaft and helically threaded drive shaft.

11. The apparatus of claim 10 wherein said elevator further includes a stepper motor, a slip clutch, a drive shaft, a first pulley attached to the drive shaft, a second pulley attached to the helical shaft, and a drive belt for coupling the first and second pulleys so that rotation of the drive shaft in one direction will cause the helically threaded shaft to move the horizontal plate up and rotation of the drive shaft in the opposite direction will cause the helically threaded shaft to move the horizontal plate down.

12. The apparatus of claim 11 wherein said elevator further includes a rotary encoder for detecting rotation of the drive shaft.

13. The apparatus of claim 1 further including an internal microprocessor-based controller for controlling the operation of the picker, the tray, the print station, the cleaning station, and the recording station.

14. The apparatus of claim 1 further including an interface for connecting the apparatus to an external controller which controls the operation of the picker, the tray, the print station, the cleaning station, and the recording station.

* * * * *